United States Patent
Anderson et al.

(10) Patent No.: US 12,461,835 B2
(45) Date of Patent: Nov. 4, 2025

(54) SYSTEM AND METHOD FOR INTEGRITY MONITORING OF HETEROGENEOUS SYSTEM-ON-A-CHIP (SoC) BASED SYSTEMS

(71) Applicant: Rockwell Collins, Inc., Cedar Rapids, IA (US)

(72) Inventors: Eric N. Anderson, Marion, IA (US); Matthew P. Corbett, Mount Vernon, IA (US); Russ D. Uthe, Ely, IA (US); Jason R. Owen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/639,523

(22) Filed: Apr. 18, 2024

(65) Prior Publication Data

US 2025/0328439 A1 Oct. 23, 2025

(51) Int. Cl.
*G06F 11/22* (2006.01)
(52) U.S. Cl.
CPC .................................. *G06F 11/2221* (2013.01)
(58) Field of Classification Search
CPC .................................................. G06F 11/2221
See application file for complete search history.

(56) References Cited

U.S. PATENT DOCUMENTS

| | | | |
|---|---|---|---|
| 6,122,572 A | 9/2000 | Yavnai | |
| 7,558,987 B2 * | 7/2009 | Nardini | G06F 11/3636 |
| | | | 714/38.1 |
| 9,454,418 B1 | 9/2016 | Kovalan et al. | |
| 9,552,271 B1 | 1/2017 | Fetta et al. | |
| 10,114,777 B1 | 10/2018 | Owen et al. | |
| 10,242,179 B1 | 3/2019 | Corbett et al. | |
| 10,447,588 B1 | 10/2019 | Fannin et al. | |
| 10,719,356 B1 | 7/2020 | Corbett et al. | |
| 10,778,641 B2 | 9/2020 | Bond et al. | |
| 10,866,592 B2 | 12/2020 | Roger et al. | |
| 11,224,094 B1 | 1/2022 | Corbett et al. | |

(Continued)

FOREIGN PATENT DOCUMENTS

| | | | |
|---|---|---|---|
| EP | 4177747 A1 | 5/2023 | |
| IN | 201641008463 | 9/2017 | |
| WO | WO-2008092778 A2 * | 8/2008 | ............ G06F 11/36 |

*Primary Examiner* — Matthew M Kim
*Assistant Examiner* — Indranil Chowdhury
(74) *Attorney, Agent, or Firm* — Suiter Swantz IP

(57) ABSTRACT

A system and method for integrity monitoring on a heterogeneous system-on-a-chip (SoC) processing environment provides sets of dynamic input data to integrity applications running on one or more application cores (e.g., where safety critical applications are hosted) which generate an integrity output according to function/instruction sets. The dynamic input data is also provided to an integrity monitor running on a dissimilar integrity core (e.g., different architecture and/or other core type than the application cores) which receives the integrity output from the application cores and generates its own integrity result based on the same function sets and the same dynamic input data. The integrity monitor compares the local integrity result to the integrity outputs received from the application cores. If the integrity outputs deviate from the integrity result, the integrity core initiates a fault response, which may include resetting the deviant application core, all application cores, or the full SoC environment.

20 Claims, 9 Drawing Sheets

(56) References Cited

U.S. PATENT DOCUMENTS

| | | |
|---|---|---|
| 11,256,562 B2 | 2/2022 | Das et al. |
| 11,494,256 B2 | 11/2022 | Meriac et al. |
| 11,591,092 B2 | 2/2023 | Horner |
| 11,789,711 B2 | 10/2023 | Facory et al. |
| 2014/0201575 A1* | 7/2014 | Douskey ............... G06F 11/273 714/40 |
| 2014/0245289 A1* | 8/2014 | Marks ...................... G06F 8/61 714/38.14 |
| 2020/0026598 A1* | 1/2020 | Boschi ................ G06F 11/0784 |
| 2021/0303723 A1 | 9/2021 | Rooke et al. |
| 2022/0124009 A1 | 4/2022 | Metsch et al. |
| 2022/0209966 A1* | 6/2022 | Chhabra ............... H04L 9/0866 |
| 2024/0319261 A1* | 9/2024 | Lin .................... G01R 31/2841 |

* cited by examiner

600

| Arm V8 Instruction Sets | | | | |
|---|---|---|---|---|
| A32 | A64 | | | |
| | Base Instructions — 602 | | | |
| | DATA PROCESSING | MEMORY ACCESS | FLOW CONTROL | SYSTEM CONTROL |
| | FP Instructions | | | |
| | DATA PROCESSING | MEMORY ACCESS | FLOW CONTROL | SYSTEM CONTROL |
| | SIMD Instructions | | | |
| T32 | SVE Instructions | | | |
| | SME Instructions | | | |

| Arm V8 Registers |
|---|
| A64 |
| General Purpose – 31 x 64 bit |
| System – 3 x 64 bit |
| Exceptions – 3 x 64 bit |
| Zero Registers (XZR, WZR) – Not Writable – 2 x 64 bit |
| Program Counter (PC) – Not Writable – 1 x 64 bit |
| SIMD – 32 x 128 bit |

SYSTEM AND METHOD FOR INTEGRITY MONITORING OF HETEROGENEOUS SYSTEM-ON-A-CHIP (SoC) BASED SYSTEMS

BACKGROUND

Integrated modular avionics (IMA) systems require high data integrity (e.g., $1E^{-9}$ or better) solutions in order to ensure the avionics system never presents hazardously misleading information (HMI). For example, communications systems may encrypt or decrypt outbound or inbound messages, or encapsulate commands (e.g., via CRC checksum) to ensure payload integrity. Navigations and operations systems may receive a constant flow of raw data (e.g., sensor readings, environmental conditions, air data, timing information); this raw data may be used for other calculations (e.g., aircraft configuration, heading) and/or presented to the pilot or crew in a variety of formats. Some or all of this information, as well as the onboard applications and functions making use of the data, may be safety critical in that erroneous processing or representation of the data may endanger the aircraft, its crew, and its passengers.

Even assuming the validity of raw input data, undetected design flaws in avionics processing hardware may create common mode faults which may in turn result in HMI. However, development of specific logic for monitoring safety critical functions and outputs for common mode faults increase the size, weight, power, and cost (SWAP-C) factors associated with the resulting IMA system. Dual lockstep computing and triple modular redundancy (TMR) are established approaches for mitigating common mode faults due to design flaws. Similarly, higher level A/B or left-right differences in hardware and software solutions may be deployed. However, none of these approaches are ideal or optimal, either from a SWAP-C perspective or in terms of their effectiveness (e.g., due to the multiple processing targets for which application providers must develop and/or integrate).

SUMMARY

In a first aspect, a heterogeneous system-on-a-chip (SoC) processing environment is disclosed. In embodiments, the SoC includes one or more application processing cores (application cores; e.g., whereon safety-critical applications may be hosted or otherwise configured for execution) and one or more dissimilar integrity processing cores (integrity cores; e.g., dissimilar in terms of instruction sets or other appropriate core types). Integrity applications running on the application cores receive live sets of dynamic input data used by the safety-critical applications and, based on function or instruction sets, generate integrity outputs from the dynamic input data. The dynamic input data is also forwarded to an integrity monitor running on the integrity core; the integrity monitor generates its own integrity result based on the dynamic input data and the same function sets. The integrity outputs generated at the application cores are compared with the integrity result to the locally generated integrity result. If an integrity output deviates from the integrity result, the integrity monitor may detect a fault condition (e.g., that may be indicative of a common mode fault, design flaw, or other fault on the deviant application core) and initiate a fault response.

In some embodiments, the integrity monitor running on the integrity core compares the received integrity outputs with the locally generated integrity result.

In some embodiments, the fault response includes one or more of: resetting one or more of the application cores, or resetting the SoC processing environment.

In some embodiments, the fault response includes resetting the application core/s from which the deviant integrity output/s originated.

In some embodiments, the integrity monitor receives the dynamic input data concurrently with the integrity application/s. If, for example, the integrity monitor fails to receive the dynamic input data within a threshold time window, the integrity monitor declares a fault condition.

In some embodiments, the application cores and the integrity core are powered by differentiated, mutually isolated power sources.

In some embodiments, the application cores and the integrity core are connected to independent, mutually isolated clocks or timing sources.

In some embodiments, the application cores are associated with at least one first processor architecture and/or first instruction set architecture (ISA), and the integrity core is associated with at least one second processor architecture or ISA.

In some embodiments, the integrity applications running on the application cores receive sets of dynamic input data via a first input/output (I/O) interface (e.g., network interface, network path), and the integrity monitor running on the integrity core receives the sets of dynamic input data via a second, differentiated I/O interface or path.

In some embodiments, either the application cores or the integrity core may be embodied in a graphics processing unit (GPU), digital signal processor (DSP), or some other specialized processing unit.

In some embodiments, the SoC environment further includes a watchdog monitor running on independently provisioned logic (e.g., FPGA, ASIC, MCU) differentiated from both the application cores and the integrity cores. For example, the watchdog monitor receives the integrity outputs from the integrity application/s running on the application core/s and the corresponding integrity results generated by the integrity monitor running on the integrity core. Further, the watchdog monitor also receives the dynamic input data and generates its own integrity benchmark, e.g., based on the same function sets. The watchdog monitor compares the local integrity benchmark to the received integrity outputs and integrity results.

In some embodiments, any deviations detected by the watchdog monitor (e.g., if the integrity results or integrity outputs deviate from the integrity benchmark, if two elements agree but a third element deviates) may lead the watchdog monitor to detect a fault condition. Either or both of the integrity monitor or the watchdog monitor may initiate a fault response if the watchdog monitor detects a fault condition (e.g., resetting a deviant application core or integrity core, resetting all application cores, resetting the full SoC environment).

In a further aspect, a method for integrity monitoring in a heterogeneous SoC processing environment is also disclosed. In embodiments, the method includes receiving, via an integrity application running on one or more application cores (e.g., processing cores wherein safety-critical applications are hosted or otherwise configured for execution), one or more sets of dynamic input data (e.g., common mode input data, safety-critical input data). The method includes receiving the sets of dynamic input data via an integrity monitor running on a dissimilar integrity core of the SoC (e.g., differentiated from the application cores in core type, architecture, and/or any other appropriate aspects). The method includes generating an integrity output via the integrity application running on the application core/s, by executing function or instruction sets on the received dynamic input data. The method includes generating an integrity result via the integrity monitor running on the integrity core, by executing the same function sets on the same dynamic input data. The method includes comparing the integrity outputs generated at the application cores to the integrity result generated at the integrity core. The method includes, when the integrity output/s deviate from the integrity result, initiating a fault response.

In some embodiments, the method includes forwarding the integrity outputs to the integrity monitor running on the integrity core. The method includes comparing, via the integrity monitor, the integrity outputs received from the application cores to the locally generated integrity result.

In some embodiments, the method includes, when the integrity output/s deviate from the integrity result, initiating a fault response via the integrity monitor. For example, the integrity monitor may initiate a reset of any application cores from which a deviant integrity output originated. In some embodiments, the integrity monitor may initiate a reset of all application processing cores. In some embodiments, the integrity monitor may initiate a reset of the full SoC processing environment.

In some embodiments, the method includes receiving the dynamic input data via a watchdog monitor running on independently provisioned logic differentiated from both the application cores and the integrity core. The method includes generating an integrity benchmark via the watchdog monitor, by executing the same function sets on the same dynamic input data. The method includes receiving, via the watchdog monitor, the integrity outputs generated at the application core/s and the integrity result generated at the integrity core. The method includes comparing, via the watchdog monitor, the integrity outputs and integrity result with the locally generated integrity benchmark.

In some embodiments, the method includes, when the integrity output/s, integrity result, and integrity benchmark deviate (e.g., fail to uniformly agree), initiating a fault response via the integrity monitor or the watchdog monitor. For example, depending on the specific deviation, the watchdog monitor or integrity monitor may initiate a reset of: one or more deviant application cores, a deviant integrity core, all application cores, or the whole SoC processing environment.

In some embodiments, the application core/s are powered via a first power source, and the integrity core is powered by a second power source differentiated and isolated from the first power source.

In some embodiments, the application core/s receive timing signals and information via a first clock or timing source, and the integrity core receives timing information via a second power source differentiated and isolated from the first power source.

In some embodiments, the integrity monitor running on the integrity core receives the dynamic input data set/s concurrently with the integrity application/s running on the application core/s. For example, when the integrity monitor fails to receive the dynamic input data within a threshold time window, the integrity monitor detects a fault condition.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 6A is a block diagram illustrating an instruction set architecture (ISA) of the heterogeneous multi-core processing environment of FIG. 4;

FIG. 6B is a block diagram illustrating partitioning of memory registers of the heterogeneous multi-core processing environment of FIG. 4;

DETAILED DESCRIPTION

Figure 1:
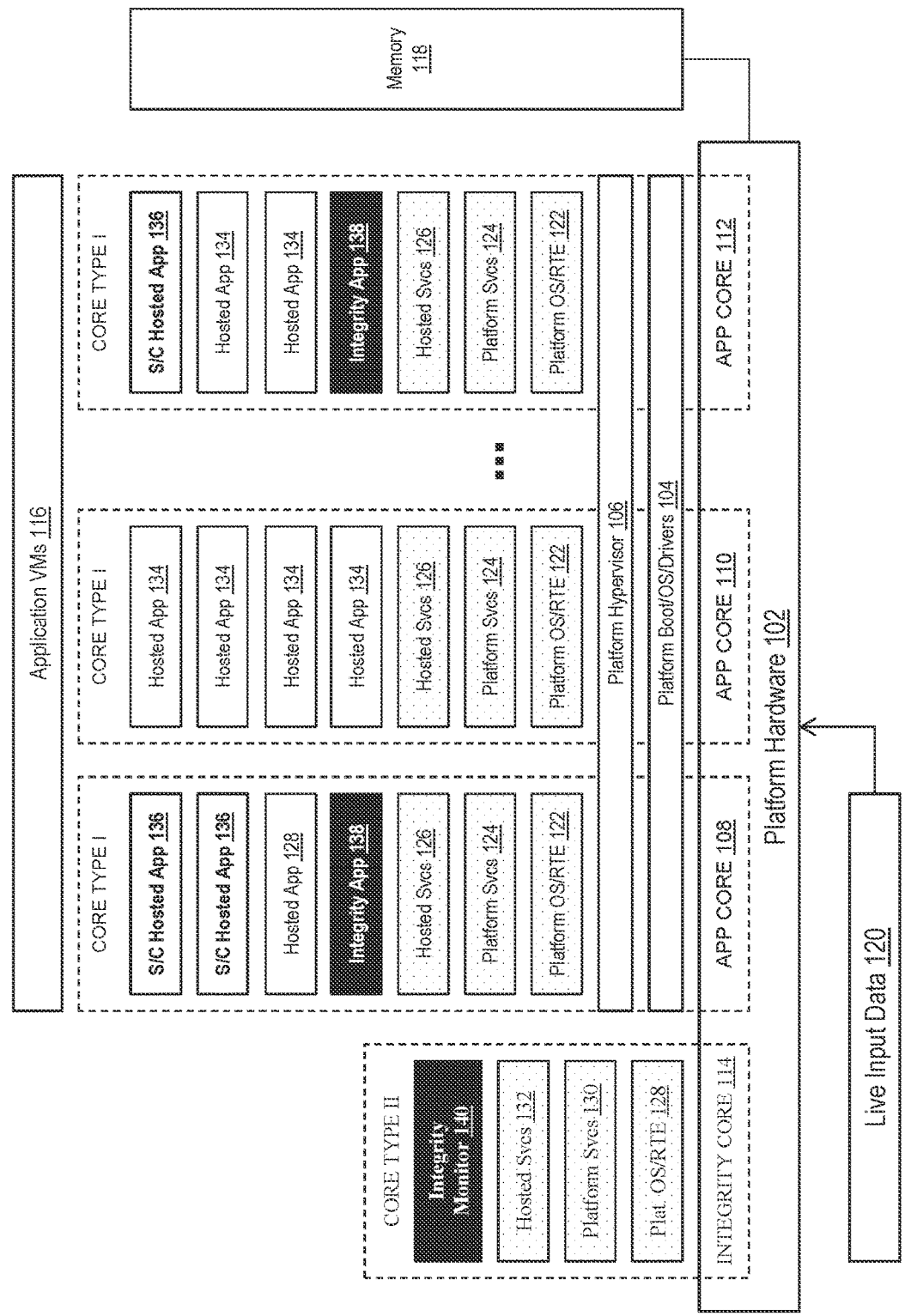
FIG. 1 is a block diagram illustrating a heterogeneous multi-core processing environment according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

The following U.S. Patents are herein incorporated by reference in their entirety: U.S. Pat. No. 10,719,356 titled "High integrity multicore computing environment with granular redundant multi-threading"; U.S. Pat. No. 11,224,094 titled "Shared networking infrastructure with multi-link channel bonding"; U.S. Pat. No. 10,114,777 titled "I/O synchronization for high integrity multicore processing"; U.S. Pat. No. 10,242,179 titled "System-on-chips"; U.S. Pat. No. 11,494,256 titled "Memory scanning operation in response to common mode fault signal"; U.S. Pat. No. 11,591,092 titled "Dissimilar microcontrollers for outflow valve"; U.S. Pat. No. 9,454,418 titled "Method for testing capability of dissimilar processors to achieve identical computations".

FIG. 1—PROCESSING ENVIRONMENT

Referring now to FIG. 1, the heterogeneous multi-core system-on-a-chip (SoC) processing environment 100 is shown. The SoC processing environment 100 may include platform hardware 102, platform software 104 (e.g., boot, operating system (OS), drivers), platform hypervisor (e.g., virtual machine (VM)) 106, application processing cores 108, 110, 112, integrity processing core 114, application-level VMs 116, memory 118, and live input data 120.

In embodiments, the SoC processing environment 100 may include multiple SoCs or a single SoC incorporating multiple physical processing cores. Similarly, the application processing cores 108, 110, 112 may each comprise one or more physical processing cores or virtual processing cores, e.g., a single physical processing core may be partitioned into two or more virtual application processing cores.

In embodiments, the SoC processing environment 100 may be heterogeneous (e.g., heterogenous) in that the application processing cores 108, 110, 112 and the integrity processing core 114 may be fundamentally dissimilar in one or more aspects. For example, the application processing cores 108, 110, 112 may be of a first core type (e.g., Intel, x86 (and extensions thereof), ARM (e.g., AARCH64, A64, AARCH32, A32, T32), PowerPC, PowerISA, ARCompact (ARC), MicroBlaze, MIPS, RISC-V) or incorporate a first instruction set architecture (ISA), while the integrity processing core 114 may be of a second core type (e.g., any other appropriate core type and/or instruction set architecture different from the first core type).

In embodiments, the application processing cores 108, 110, 112 and/or the integrity processing cores 114 may include a dual lockstep pair of application processing cores and/or a dual lockstep pair of integrity processing cores, respectively. For example, the dual lockstep pair of application processing cores 108, 110, 112 may be synchronized and/or the dual lockstep pair of the integrity processing cores 114 may be synchronized for detecting transient faults with the application processing cores and/or the integrity processing cores, respectively. By way of another example, the application processing cores 108, 110, 112 and/or the integrity processing cores 114 may include N-modular redundancy with N of the application processing cores 108, 110, 112 and/or N of the integrity processing cores 114, respectively, where N is an integer. For example, N may be the integer three, such that triple-modular redundancy is provided.

In embodiments, the application processing cores 108, 110, 112 and/or the integrity processing cores 114 may include triple-modular redundancy with three of the application processing cores 108, 110, 112 and/or triple modular redundancy with three of the integrity processing cores 114, respectively. The N-modular redundancy may enable detecting the transient faults. However, detection of transient faults may not enable detection of common mode faults of the application processing cores 108, 110, 112 and/or the integrity processing cores 114. Like processing cores may each experience the same common mode faults. Thus, dual lockstep pairing and/or N-modular redundancy may not enable detection of common mode faults.

In embodiments, the application processing cores 108, 110, 112 and the integrity processing cores 114 may include any type of processing cores, so long as the architectures of the application processing cores 108, 110, 112 and the integrity processing cores 114 are dissimilar as noted above. For example, the application processing cores 108, 110, 112 may include any number of homogeneous application processing cores and the integrity processing cores 114 may include any number of homogenous processing cores, so long as the application processing cores 108, 110, 112 and the integrity processing cores 114 are heterogeneous relative to each other.

In embodiments, the application processing cores 108, 110, 112 and the integrity processing cores 114 may include an architecture bit width. For example, the architecture bit width may refer to bits stored in registers of the application processing cores 108, 110, 112 and/or the integrity processing cores 114. The architecture bit width may include any integer number of bits. For example, the architecture bit width may be 16-bit, 24-bit, 32-bit, 64-bit or the like. In embodiments, the architecture bit width of the application processing cores 108, 110, 112 may or may not be the same as the integrity processing cores 114.

The application processing cores 108, 110, 112 and/or the integrity processing cores 114 may experience one or more faults. For example, the application processing cores 108, 110, 112 and/or the integrity processing cores 114 may experience transient faults and/or common mode faults. Transient faults may include single event upsets. The transient faults may occur when ionizing particles strike the application processing cores 108, 110, 112 and/or the integrity processing cores 114. Common mode faults may occur where identical application processing cores 108, 110, 112 fail in the same way and/or for the same reason. Similarly, common mode faults may occur where identical integrity processing cores 114 fail in the same way for the same reason. Common mode faults may or may not be detected during design and testing of either type of processing core. Application processing cores 108, 110, 112 and/or the integrity processing cores 114 may experience the common mode faults due to an instruction set architecture (ISA) of the application processing cores 108, 110, 112 and/or an instruction set architecture of the integrity processing cores 114. The application processing cores 108, 110, 112 and/or the integrity processing cores 114 may not experience the same common mode faults due to the heterogeneity of the application processing cores 108, 110, 112 and the integrity processing cores 114. For example, the application processing cores 108, 110, 112 may not experience a common mode fault when the integrity processing cores 114 experience the common mode fault, and vice versa.

In embodiments, the underlying platform hardware 102 may include the application processing cores 108, 110, 112 and integrity processing core 114 as well as any associated graphics, network input/output (I/O) hardware, and/or custom hardware. For example, the integrity processing core 114 may include (e.g., be partially or fully embodied in) a specialized processing unit, e.g., a graphics processing, digital signal processor (DSP), or any other appropriate processor partition or processing core having an architecture distinct from the application processing cores 108, 110, 112.

In embodiments, the application processing cores 108, 110, 112 may include platform software (e.g., operating system (OS) and/or run-time environment 122 (RTE)) as well as platform services 124 and hosted services 126. Similarly, the integrity processing core 114 may also include platform OS/RTE 128, platform services 130, and hosted services 132 (e.g., compatible with the distinct architecture of the integrity processing core). Further, each of the application processing cores 108, 110, 112 may include a set of hosted applications 134 configured for execution on that core. For example, hosted applications 134 may be associated with the operation of one or more aircraft systems or subsystems.

In embodiments, one or more application processing cores 108, 112 may include safety critical (S/C) hosted applications 136 configured for execution thereon. For example, S/C hosted applications 136 may include any application receiving live input data 120 (e.g., traffic control systems, avionics systems, navigation systems, life support systems, engine control systems) wherein failure, malfunction, and/or erroneous output (e.g., hazardously misleading information) may result in 1) damage to the aircraft, other equipment or property, and/or the environment generally; or 2) harm to the pilot, crew, passengers, or nearby personnel.

In embodiments, live input data 120 may include one or more of: air data (e.g., air pressure and/or temperature external to an aircraft); timing data; position data (e.g., absolute (e.g., latitude, longitude) or relative position (e.g., inertial reference, position relative to terrain and/or landmarks) of an aircraft; attitude (e.g., roll, pitch, yaw, angle of attack); engine data (e.g., fuel consumption, RPM); flight control information (e.g., control surface positions and/or states); cabin pressure. For example, even if live input data 120 are accurate, design flaws in the application processing cores 108, 110, 112 may cause S/C hosted applications 136 to output erroneous, and potentially hazardous, data.

In embodiments, the S/C hosted applications 136 and/or the non-safety critical hosted applications 134 may be hosted applications in that they incorporate software that running on another provider's infrastructure. For example, the S/C hosted applications 136 and/or the non-safety critical hosted applications 134 may incorporate software running on the SoC processing environment 100 that is not installed or considered part of aircraft type design. In embodiments, the S/C hosted applications 136 and/or the non-safety critical hosted applications 134 may or may not include built-in detection of common mode failures. For example, the S/C hosted applications 136 and/or the non-safety critical hosted applications 134 may not include logic for monitoring common mode failures of the application processing cores 108, 110, 112 (e.g., as software developers may not be required to incorporate integrity-monitoring functionality at the application level). Instead, developers may provide non-safety critical hosted applications 134 for execution on a general-purpose computing platform provided by the application processing cores 108, 110, 112.

In embodiments, whether applications running on the application processing cores 108, 110, 112 are categorized as safety critical (e.g., S/C hosted applications 136) or non-safety critical applications (e.g., non-safety critical hosted applications 134) may determine whether an integrity application 138 is configured for execution on that application processing core. For example, any application processing core 108, 112 on which S/C hosted applications 136 are running may also host and/or execute the integrity application 138. In embodiments, the integrity application 138 may be an independent application partition running independent safety critical functions executable by any application processing core 108, 112 also hosting those same S/C hosted applications 136. For example, the integrity application 138 may generate integrity application outputs based on the same live input data 120 received and used by the S/C hosted applications 136 without imposing functional requirements for the S/C hosted applications and/or the non-safety critical hosted applications 134. For example, the platform hardware 102 may include a communications interface providing input and output (I/O) data paths for the SoC processing environment 100, via which the S/C hosted applications 136, non-safety critical hosted applications 134, and integrity applications 138 may receive live input data 120.

FIG. 2—CORE ISOLATION

Figure 2:
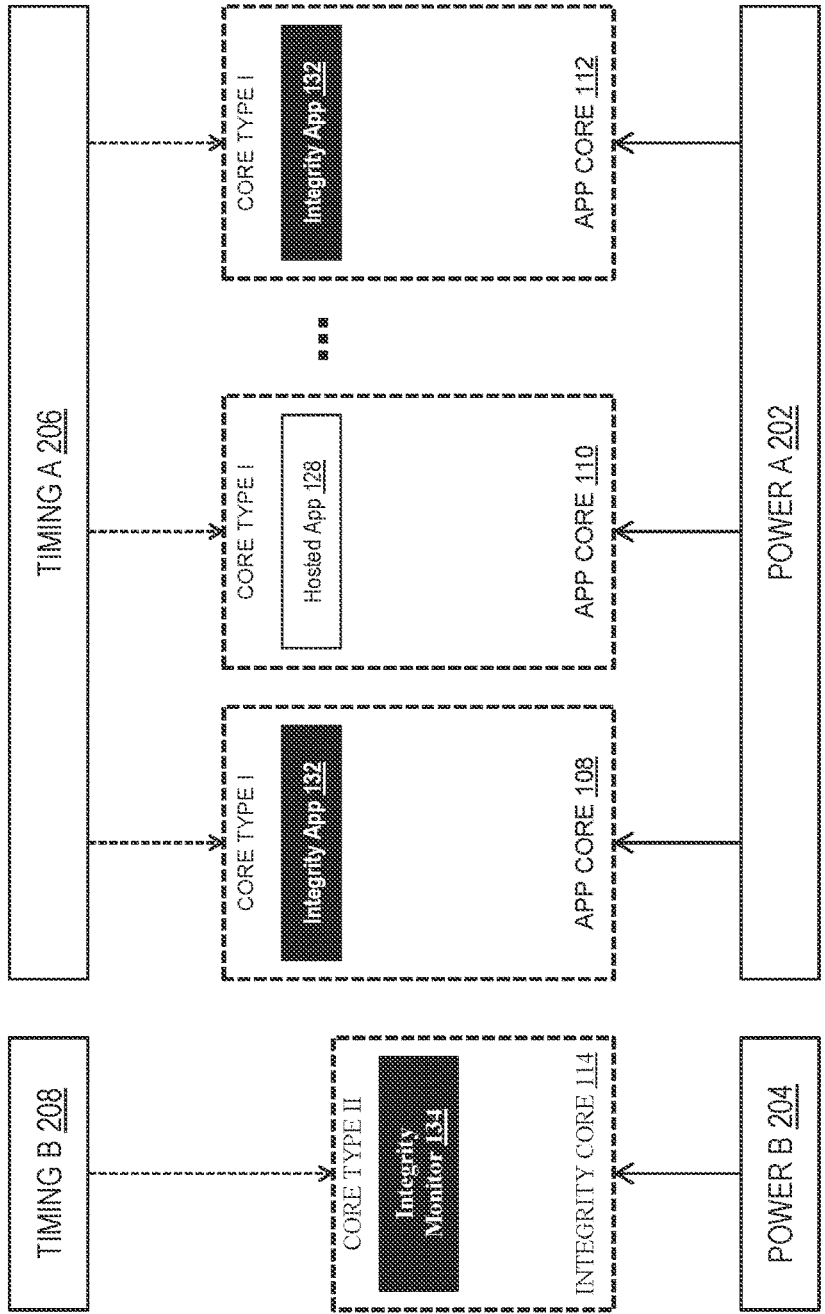
FIG. 2 is a block diagram illustrating isolation within the heterogeneous multi-core processing environment of FIG. 1.

Referring now to FIG. 2, the heterogeneous SoC processing environment 100 is shown.

In embodiments, the application processing cores 108, 110, 112 and the integrity processing core 114 may (e.g., in addition to the architectural differentiations disclosed above) be power-isolated from each other. For example, the application processing cores 108, 110, 112 may draw operating power from a first power source 202 (e.g., a single power source A (e.g., A-source) powering the application processing cores). However, the integrity processing core 114 may draw its operating power from a different power source 204 (e.g., a power source B, or B-source, distinct from and not connected to the A-source 202).

Alternatively or additionally, in some embodiments the application processing cores 108, 110, 112 and the integrity processing core 114 may be clock-isolated from each other. For example, the application processing cores 108, 110, 112 may receive timing signals from a first timing source 206 or clock (e.g., A-clock), while the integrity processing core 114 may receive timing signals from a second timing source 208 or clock (e.g., a B-clock distinct from, and not connected to, the A-clock).

FIG. 3—INTEGRITY FUNCTIONS

Figure 3:
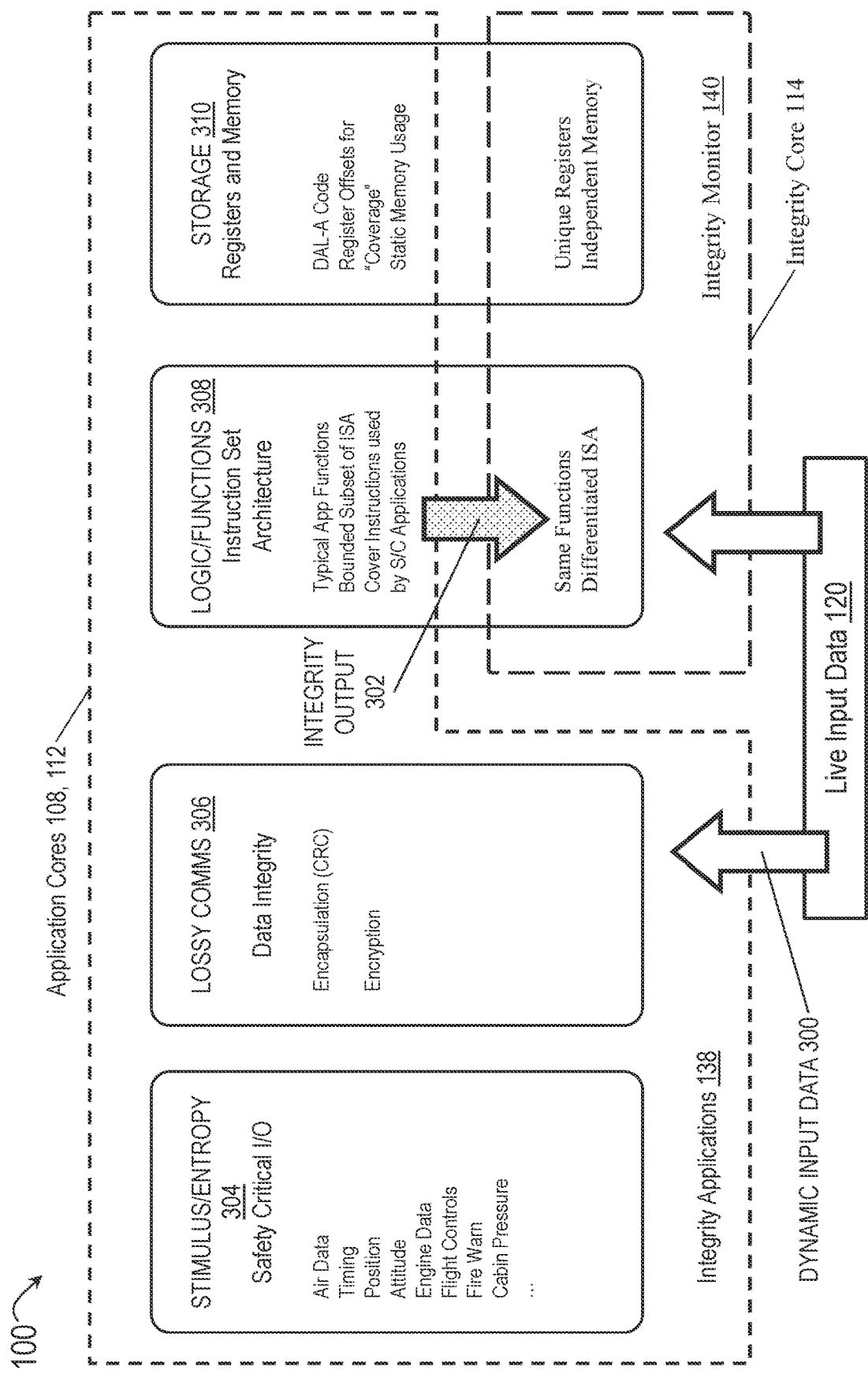
FIG. 3 is a diagrammatic illustration of integrity monitoring functions executed by the heterogeneous multi-core processing environment of FIG. 1.

In embodiments, referring also to FIG. 3, an integrity monitor 140 may be hosted by or otherwise configured for execution on the integrity processing core 114 for independent dissimilar monitoring of common mode faults or other otherwise undetected design faults on the application processing cores 108, 110, 112. For example, the integrity applications 138 independently partitioned on each application processing core 108, 112 may receive dynamic input data 300 (e.g., safety critical system inputs provided via live input data 120) and perform one or more sets of functional calculations based on safety critical system inputs (examples of which are shown by FIG. 3) and generating integrity output 302. For example, functional calculations may test the integrity of, e.g., safety critical I/O 304; communications functions 306 (e.g., including data encapsulation, CRC checksum, and/or encryption/decryption; processor logic 308 of the application processing cores 108, 112 (e.g., including subsets of the application core ISA, e.g., cover instructions used by S/C hosted applications (136, FIG. 1)); and/or data storage 310 (e.g., memory 118, memory registers, Design Assurance Level A (DAL-A) code, register offsets, static memory usage).

Concurrently, and in real time or near real time, the integrity monitor 140 running on the integrity processing core 114 may receive the same dynamic input data 300 and locally generate an integrity result via the same functional calculations, but according to the differentiated instruction set architectures of the integrity processing core 114 (or, e.g., unique and/or independent memory registers). In embodiments, the integrity applications 138 running on each application processing core 108, 112 may each forward their locally generated integrity output 302 to the integrity monitor 140 running on the integrity processing core 114. For example, the integrity monitor 140 may compare the integrity output 302 received from each application processing core 108, 112 to its own corresponding locally generated (but dissimilar) integrity result (e.g., the results of the same functional calculations based on the same dynamic input data 300). In embodiments, when the integrity monitor 140 determines that the integrity output 302 received from the application processing cores 108, 112 is substantially identical to the corresponding integrity result locally generated by the integrity monitor on the integrity processing core 114 (e.g., "valid compare"), the integrity monitor 140 may report a nominal state wherein the application processing cores 108, 112 are not affected by common mode faults, conditions where a common mode fault or other fault may be present, or other like design flaws.

In embodiments, when the integrity monitor 140 determines that the integrity output 302 received from the application processing cores 108, 112 substantially deviates from the corresponding integrity result locally generated by the integrity monitor on the integrity processing core 114 (e.g., "mis-compare"), the integrity monitor 140 may indicate the presence of a fault condition potentially affecting S/C hosted applications 136 running on the application processing cores. For example, the identification of a fault condition may not be equivalent to the explicit detection of a common mode fault, but may indicate a deviation potentially caused by a common mode fault, a hard logic error, a design flaw, or some other fault associated with the application processing cores 108, 112 and that may result in the processing, output, or display of hazardously misleading information (HMI). In embodiments, the integrity monitor 140 may detect a fault condition based on a single deviation or on a threshold level of deviations (e.g., within a predetermined time window). In embodiments, the SoC processing environment 100 may incorporate temporal buffering (as disclosed in related concurrently filed patent application Ser. No. 18/639,573, which application is herein incorporated by reference in its entirety) to ensure the concurrence of integrity output 302 received by the integrity monitor 140 with corresponding integrity result (e.g., utilizing the same functional calculations and based on the same sets of dynamic input data 300) locally generated by the integrity monitor.

FIG. 4—INTEGRITY MONITORING WITHIN THE SOC

Figure 4:
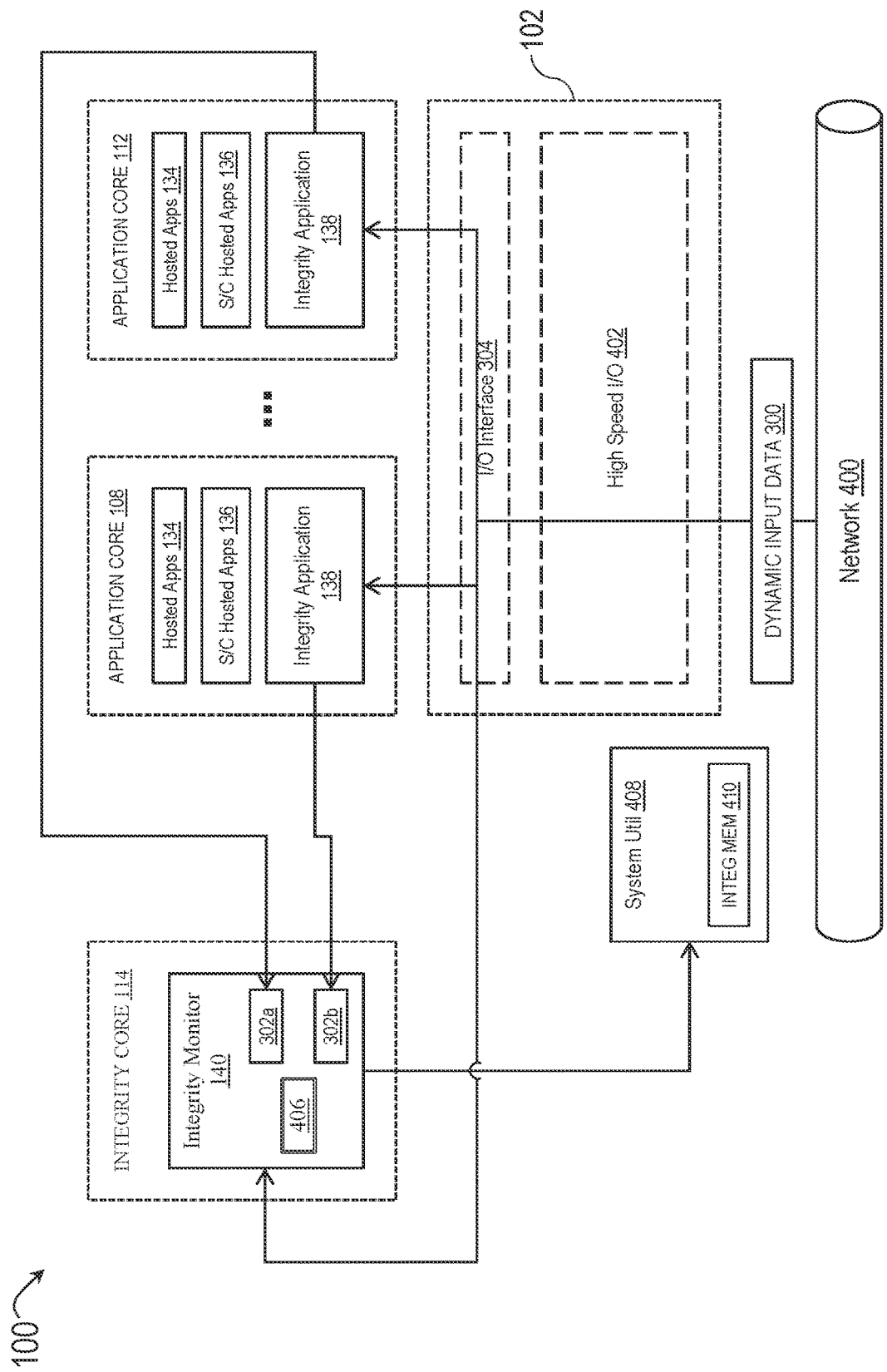
FIG. 4 is a block diagram illustrating integrity monitoring operations of the heterogeneous multi-core processing environment of FIG. 1.

Referring now to FIG. 4, the SoC processing environment is shown.

In embodiments, the integrity applications 138 running on application processing cores 108, 112 (e.g., those application processing cores hosting or otherwise running S/C hosted applications (136, FIG. 1)) and the integrity monitor 140 running on the dissimilar integrity processing core 114 may concurrently receive the same set (e.g., identical sets, identical copies) of dynamic input data 300 from an external network 400 (e.g., aircraft-based network) via high speed I/O 402 (e.g., PCI, Ethernet) and an I/O interface 404*a*, 404*b* (e.g., network interface) within the platform hardware 102 of the SoC processing environment 100. The integrity monitor 140 and integrity applications 138 may continually provide integrity monitoring in real-time or near-real time, using dynamically changing sets of dynamic input data 300.

For example, the integrity applications 138 running on application processing cores 108, 112 may receive dynamic input data 300 via the I/O interface 404. Each integrity application 138 running on application processing cores 108, 112 may execute a set of functional calculations based on the received dynamic input data 300 (e.g., according to the core type and/or instruction set architecture of the application processing cores), generating integrity output 302*a*, 302*b* respectively. The integrity outputs 302*a*, 302*b* may be forwarded to the integrity monitor 140 running on the integrity processing core 114. Concurrently, the integrity monitor 140 may receive the same set/s of dynamic input data 300 via the I/O interface 404*b* and may perform the same functional calculations upon the common input data (e.g., according to the local core type and/or instruction set architecture), generating the integrity result 406.

In embodiments, the integrity monitor 140 may compare the integrity outputs 302*a*, 302*b* received from the integrity applications 138 running on each application processing core 108, 112 with the locally generated integrity result 406. For example, when the integrity outputs 302*a*, 302*b* substantially match the integrity result 406, the integrity monitor 140 may indicate to system utilities 408 (e.g., power management, boot control, and other functions of the SoC processing environment 100) that the integrity of the application processing cores 108, 112 (e.g., and any S/C hosted applications 136 running thereon) are or remain nominal (e.g., valid compare). However, when one or more integrity outputs 302*a*, 302*b* received from the application processing cores 108, 112 do not substantially match the integrity result 406, the integrity monitor 140 may indicate the presence of a fault condition (e.g., mis-compare) that may threaten the integrity of the S/C hosted applications 136 (as well as any data output by the S/C hosted applications, and any displays, readings, or input to other systems derived from said data output).

In embodiments, the integrity monitor 140 may indicate a valid compare or a mis-compare with respect to a comparison of integrity outputs 302a, 302b and corresponding integrity result 406 based on an exact, bit-for-bit alignment of each integrity output with the integrity result. Alternatively, the integrity monitor 140 may indicate a valid compare or a mis-compare on the basis of a tolerance match. For example, if the integrity outputs 302a, 302b match the integrity result 406 within a threshold tolerance (e.g., 99% match, 99.5% match; no more than 1 or 2 unmatched bits per hundred), a valid compare may still be indicated.

In some embodiments, the integrity monitor 140 may impose a time window when receiving a given set of dynamic input data 300. For example, when the integrity monitor 140 receives a set of dynamic input data 300, and fails to receive an integrity output 302b corresponding to the received common input data (and/or to the locally generated integrity result 406 based on that common input data) within the predetermined time window, the integrity monitor may indicate a mis-compare with respect to the application processing core 112 that failed to timely forward an integrity result.

In embodiments, when the integrity monitor 140 indicates a mis-compare or other related fault with respect to an integrity output 302b received from an application processing core 112, the integrity monitor may initiate one or more fault responses. For example, the integrity monitor 140 may initiate a reset, e.g., by directing system utilities 408 to reset the application processing core 112 from which the deviant integrity output 302b originated. In some embodiments, e.g., if multiple integrity outputs 302a, 302b and/or multiple application processing cores 108, 112 are deviant, if the system utilities 408 fail to reset the application processing core 112, if the deviation is sufficient to cause a flight hazard, the integrity monitor 140 may initiate a full reset by directing system utilities 408 to reset all application processing cores 108, 110, 112.

In some embodiments, the integrity monitor 140 may initiate other fault responses in the event a fault condition is detected. In embodiments, system utilities 408 may include an integrity memory 410 and/or strike counter, e.g., as disclosed by related application having Ser. No. 18/639,573. For example, any mis-compares indicated by the integrity monitor 140 may be stored to the integrity memory 410 (which may include the deviant integrity output 302, the relevant integrity result 406, the relevant functional calculations, and/or the relevant dynamic input data 300).

FIG. 5—INDEPENDENT/DIFFERENTIATED DATA FLOWS

Figure 5:
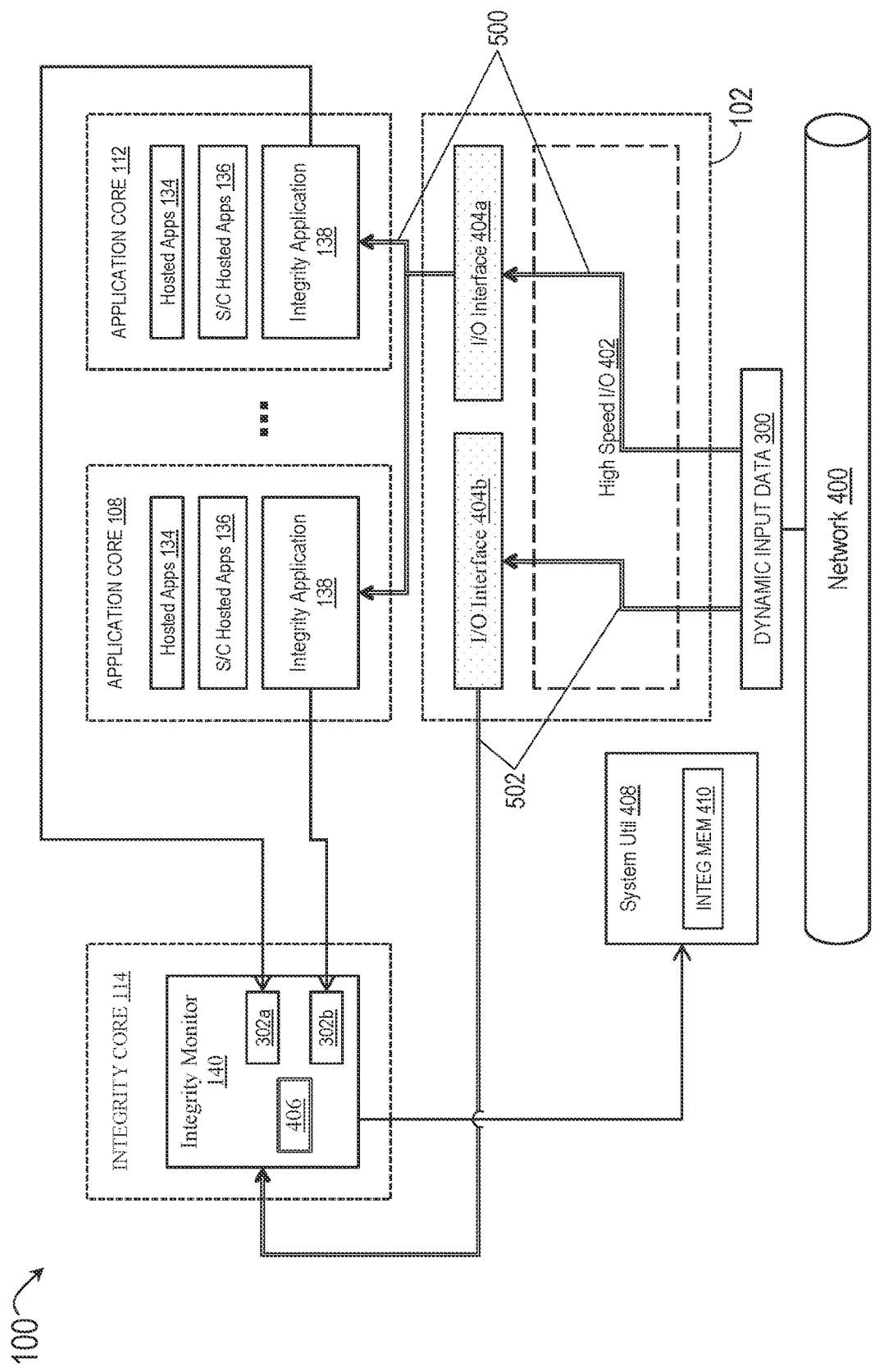
FIG. 5 is a block diagram illustrating additional differentiation within the heterogeneous multi-core processing environment of FIG. 4.

Referring now to FIG. 5, in embodiments the SoC processing environment 100 may provide enhanced integrity monitoring by introducing new dimensions of dissimilarity between the integrity processing core 114 and the application processing cores 108, 112 wherein S/C hosted applications 136 are running. For example, the platform hardware 102 may provide for a first independent data path 500 via which dynamic input data 300 may reach the application processing cores 108, 112 from the network, and a second independent data path 502 via which that common mode input data may concurrently reach the integrity monitor 140. Additionally, or alternatively, independent or differentiated network interfaces 404a, 404b (e.g., data paths) may be used to forward dynamic input data 300 from the network 400 to the application processing cores 108, 112 and to the integrity processing core 114 respectively.

FIGS. 6A/6B—ISA PARTITIONING CONSTRAINTS, MEMORY REGISTERS

Referring now to FIGS. 6A and 6B, a base instruction set 600 of the application processing cores (108, 110, 112; FIG. 1) and the memory 118 are respectively shown.

In embodiments, the SoC processing environment 100 may limit access by S/C hosted applications (136, FIG. 1) running on application processing cores 108, 112 to specific subsets of the full instruction set. Accordingly, the integrity applications (138, FIG. 1) and integrity monitor (140, FIG. 1) may be constrained to the same specific subset/s with respect to integrity monitoring according to embodiments of the inventive concepts disclosed herein. By way of a non-limiting example, the application processing cores 108, 112 may be ARM A-series cores, and any S/C hosted applications 136 running on those application processing cores may be constrained to the ARM A-profile A64 base instruction set 600 shown by FIG. 6A. By way of a further example, S/C hosted applications 136 (and therefore the integrity applications 138 and integrity monitor 140) may be allowed access to a subset of base and floating-point (FP) instructions (e.g., data processing, memory access, flow control), but may be constrained from the remainder of the instruction set 600, e.g., A32 and T32 (Thumb) instruction sets; single instruction/multiple data (SIMD) instruction sets; scalable vector extension (SVE) instructions; and scalable matrix extension (SME) instructions.

In some embodiments, the SoC processing environment 100 may further constrain S/C hosted applications 136 (and the integrity applications 138 and integrity monitor 140) to a subset 602 of the instruction set. For example, the S/C hosted applications 136 may be further constrained from any instructions not available to applications during flight operations, e.g., debugging and memory related instructions. In some embodiments, full coverage of the ISA may be verified through analysis of the design constraints, or via inspection of assembly instructions associated with S/C hosted applications 136 and/or functional calculations executed by the integrity applications (138, FIG. 1) running on the application processing cores.

Referring also to FIG. 6B, in embodiments any functional calculations executed by the integrity applications 138 on the application processing cores 108, 112 (e.g., and by the integrity monitor 140 on the integrity processing core 114) may also require access not only to the ISA instructions used by the S/C hosted applications 136, but also the memory registers used by those instructions. For example, during flight operations, the specific system registers used by any particular version of a S/C hosted application 136 or a hosted application 134 may be static and consistent. In embodiments, integrity applications 138 may ensure comprehensive coverage of interactions between the instruction set 600 and the memory 118 by using the same S/C input sources (e.g., dynamic input data 300) and executing functional calculations associated with typical S/C operations. In some embodiments, integrity applications 138 may further enhance this coverage by offsetting nominal register usage.

In embodiments, referring in particular to FIG. 6B, the SoC processing environment 100 may likewise constrain S/C hosted applications 136 running on the application processing cores 108, 112 (and the integrity applications 138 and integrity monitor 140) to a subset of available registers within the memory 118. For example, S/C hosted applications 136, integrity applications 138, and the integrity monitor 140 may be constrained to general-purpose registers 604 only and denied access to all other memory registers.

In some embodiments, general-purpose registers 604 may include hidden general-purpose registers. For example, multiple execution units within the application processing cores 108, 112 may utilize registers within the memory 118 for storage of intermediate data, wherein register renaming is executed at instruction dispatch and resolved prior to write back. In embodiments, these registers may be embodied as "hidden" registers within the general-purpose registers 604.

FIG. 7—INDEPENDENT WATCHDOG MONITOR

Figure 7:
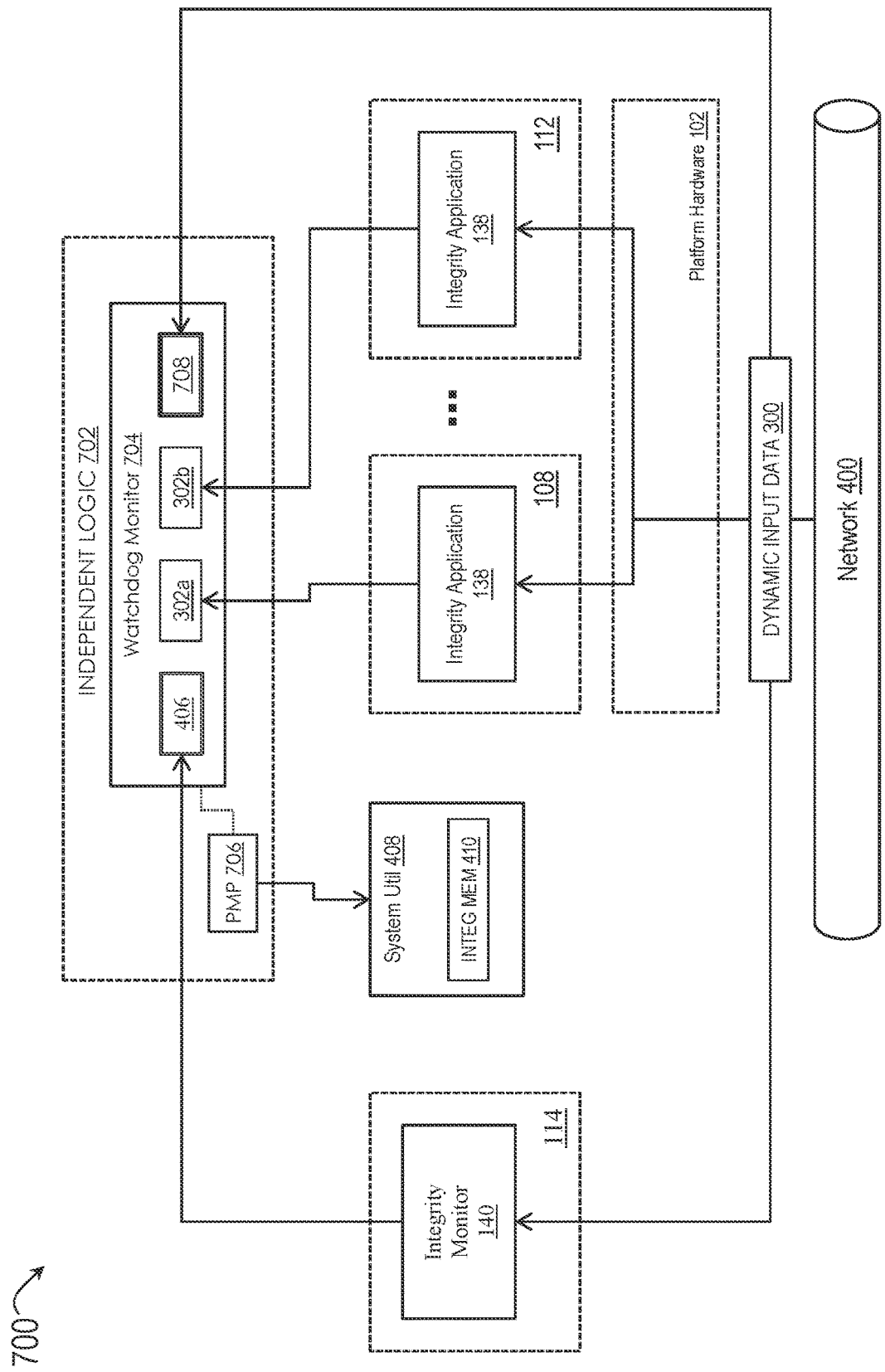
FIG. 7 is a block diagram illustrating a heterogeneous multi-core processing environment incorporating an independent watchdog monitor according to example embodiments of this disclosure.

Referring now to FIG. 7, the heterogeneous SoC processing environment 700 may be implemented, and may function similarly to the heterogeneous SoC processing environment of FIGS. 1 through 6B, except that the heterogeneous SoC processing environment 700 may add a further level of differentiation via independently provisioned logic 702. In embodiments, the independently provisioned logic 702 may include conventional processing cores, field-programmable gate arrays (FPGA), application specific integrated circuits (ASIC), microcontroller units (MCU), and/or any other appropriate implementations associated with one or more third architectures and/or differentiated (e.g., with respect to the processor architecture, ISA, and any other aspects as appropriate) from both the application cores 108-112 and the integrity processing core 114. For example, the independently provisioned logic 702 may include (e.g., configured for execution thereon) a watchdog monitor 704 and/or platform management processor 706.

In embodiments, the integrity applications 138 may forward their integrity outputs 302a, 302b, and the integrity monitor 140 may forward its integrity result 406, to the watchdog monitor 704 for analysis. While, for example, the SoC processing environment 100 may assign the comparison of integrity outputs 302a, 302b and integrity results 406 to the integrity monitor 140, the SoC processing environment 700 may incorporate additional differentiation to provide integrity monitoring of the integrity processing core 114 as well as the application processing cores 108-112.

In embodiments, the watchdog monitor 704 may be provided with the same dynamic input data 300 as used by the integrity application 138 in generating the integrity outputs 302a, 302b, and as used by the integrity monitor 140 in generating the integrity results 406. For example, based on the dynamic input data 300, the watchdog monitor 704 may generate an integrity benchmark 708, which the watchdog monitor 704 may use for comparison to the integrity result 406 as well as the integrity outputs 302a, 302b.

In embodiments, the watchdog monitor 704 may detect a fault condition with respect to one or more application processing cores 108-112 (e.g., on which S/C hosted applications (136, FIG. 1) are configured for execution), or with respect to the integrity processing core 114. For example, to the extent that the precise source of a fault indicated by a detected fault condition can be determined (which is not always the case), a deviant result or other fault condition associated with a single application processing core 108-112 is likely indicative of a fault in that particular application processing core, while a deviant result or fault condition associated with all application processing cores is likely indicative of a fault in the integrity processing core 114. If, however, there is one application processing core 108-112 and one integrity processing core 114, either core may be the source of an underlying fault associated with a detected fault condition.

By way of a non-limiting example, if one or more integrity outputs 302a, 302b deviates from the integrity result 406, but the integrity result and the integrity benchmark 708 agree, the watchdog monitor 704 may determine that a fault condition exists with respect to the deviant application processing core/s 108-112 and direct (e.g., via the platform management processor 706) system utilities 408 to initiate an appropriate fault response (e.g., resetting the deviant application processing core/s, resetting all application processing cores). In some embodiments, if the integrity outputs 302a, 302b agree with the integrity benchmark 708 but the integrity result 406 may deviate from the integrity benchmark 708. Accordingly, the watchdog monitor 704 may detect a fault condition associated with the integrity processing core 114 and initiate a fault response, e.g., resetting the integrity processing core or resetting the SoC processing environment 700 as a whole.

Alternatively, or additionally, the presence of three (or any other odd number greater than 1) processing cores or core types within the SoC processing environment 700 may enable the resolution of deviations among the integrity outputs 302a-302b, the integrity results 406, and the integrity benchmark 708 via voting out the deviant result. For example, if two of the integrity outputs 302a-302b, the integrity result 406, and the integrity benchmark 708 agree but the third does not, the origin of the disagreeing result (e.g., the integrity output or the integrity result) may indicate the source of the underlying fault (e.g., the application processing core/s 108-112 or the integrity processing core 114, respectively). In some embodiments, the SoC processing environment 700 may include three or more differentiated core types not including the independently provisioned logic 702.

FIGS. 8A THROUGH 8C—METHOD

Figure 8A:
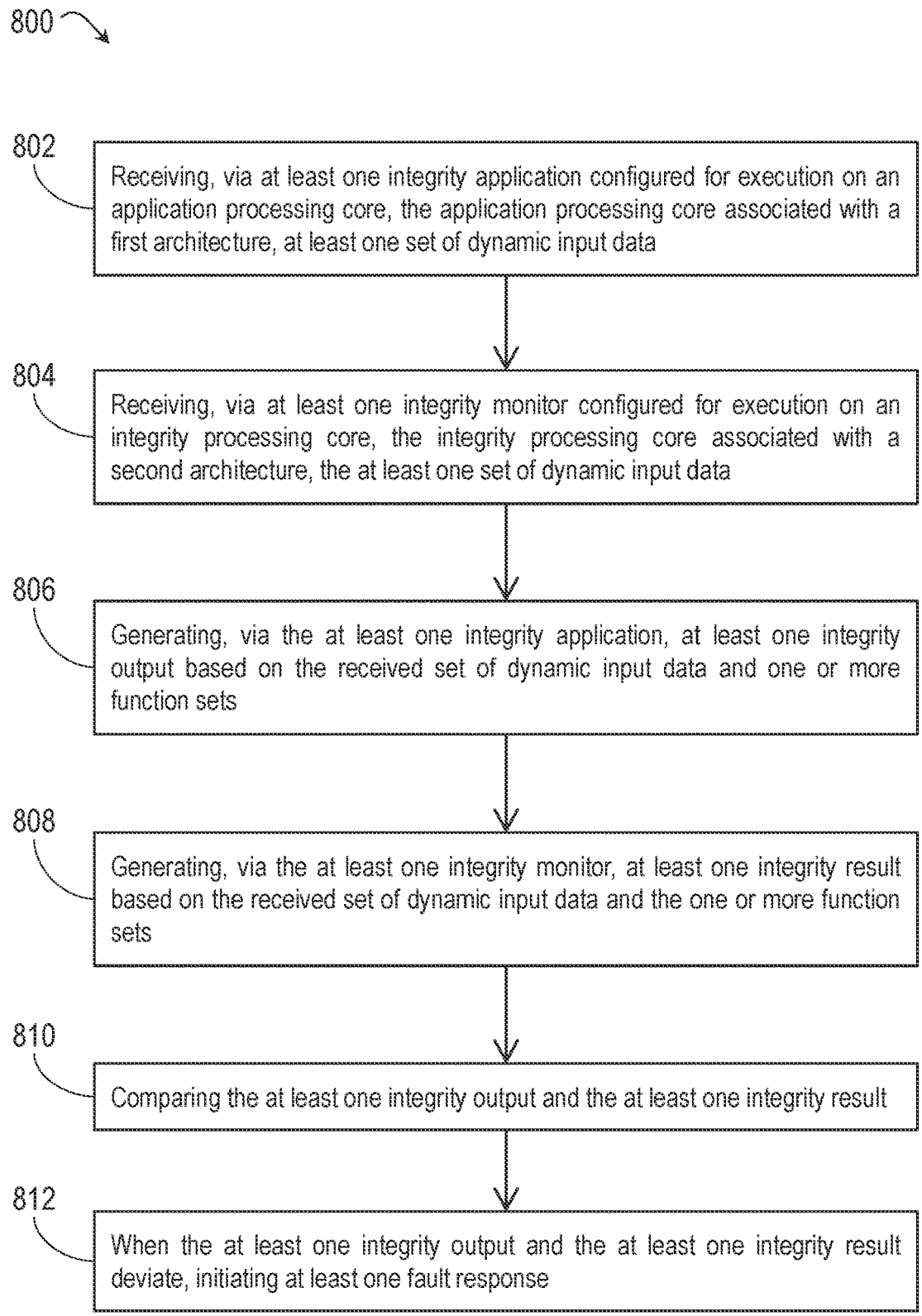
FIGS. 8A through 8C are flow diagrams illustrating a method for integrity monitoring in a heterogeneous multi-core processing environment according to example embodiments of this disclosure.

Referring now to FIG. 8A, the method 800 may be implemented by the SoC processing environments 100, 700 and may incorporate the following steps.

At a step 802, at least one integrity application configured to run on an application processing core of the SoC processing environment receives safety critical (S/C) common mode input data from an aircraft network. For example, the application processing core corresponds to a first instruction set architecture (ISA), architecture, and/or core type.

At a step 804, at least one integrity monitor application configured to run on an integrity processing core of the SoC processing environment receives the S/C common mode input data. For example, the integrity processing core may be of a different ISA, architecture, and/or core type than the application processing cores. In some embodiments, the application processing core and the integrity processing core are power isolated (e.g., mutually isolated power sources) and/or timing isolated (e.g., mutually isolated clocks or timing sources) from each other.

At a step 806, the integrity application running on the application processing core generates an integrity output by executing a set of functional calculations (e.g., function sets, instruction sets) based on the received S/C common mode input data.

At a step 808, the integrity monitor running on the integrity processing core generates an integrity result by executing the same set of functional calculations based on the same received S/C common mode input data. In some embodiments, the integrity monitor (running on the integrity processing core) and the integrity application (running on the application processing core) receive the same set of S/C common mode input data via different network interfaces and/or data paths.

At a step 810, the integrity output and the integrity result are compared. For example, in some embodiments the integrity processing core receives the integrity output/s from the application processing core/s and compares the integrity output/s received from the application processing core to the locally generated integrity result.

At a step 812, when the integrity output deviates from the locally generated integrity result, a fault condition is detected (e.g., that may be indicative of a potential common mode fault, design flaw, or some other like error state) and a corrective fault response is initiated. For example, if the integrity monitor determines that the received integrity output/s received from one or more application processing cores deviate from the locally generated integrity result, a fault condition may be detected with respect to the application processing core/s from which the deviant integrity output originated. In some embodiments, the integrity monitor detects a fault if, when receiving a set of S/C common mode input data, the integrity monitor receives no concurrent integrity output from the application processing core (e.g., within a predetermined time window). In some embodiments, the corrective fault response includes resetting the application processing core from which the deviant integrity output originated. In some embodiments, the corrective fault response includes resetting all application processing cores of the SoC processing environment.

Figure 8B:
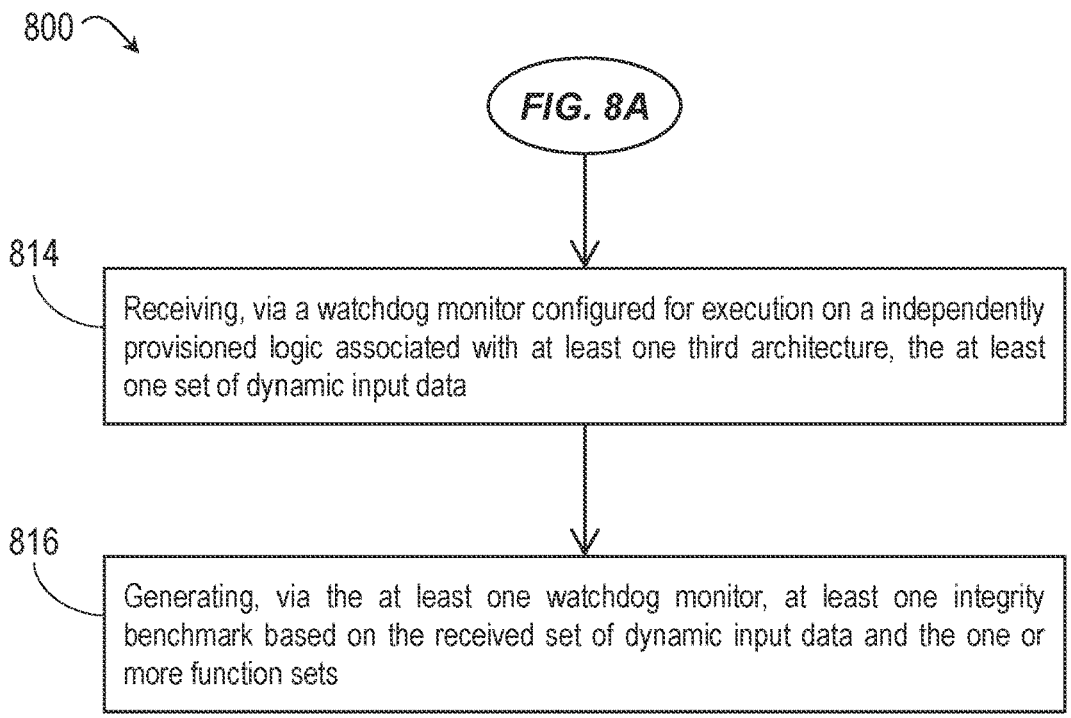

Referring also to FIG. 8B, the method 800 may include additional steps 814 and 816. At the step 814, In some embodiments, the integrity output/s and integrity result/s are forwarded to a watchdog monitor configured for execution on a tertiary processing core (e.g., associated with a third instruction set architecture (ISA) or third processor architecture distinct from both the integrity processing core/s and the application processing core/s. At the step 816, the watchdog monitor (using the same dynamic input data and the same functional calculations) generates an integrity benchmark. The integrity output/s and integrity result/s are compared by the watchdog monitor to this locally generated integrity benchmark. For example, if one or more integrity output/s deviate from the integrity result but the integrity result and the integrity benchmark agree, a fault condition may be detected and a fault response initiated by the watchdog monitor with respect to the application processing core/s from which the deviant integrity output/s originated.

Figure 8C:
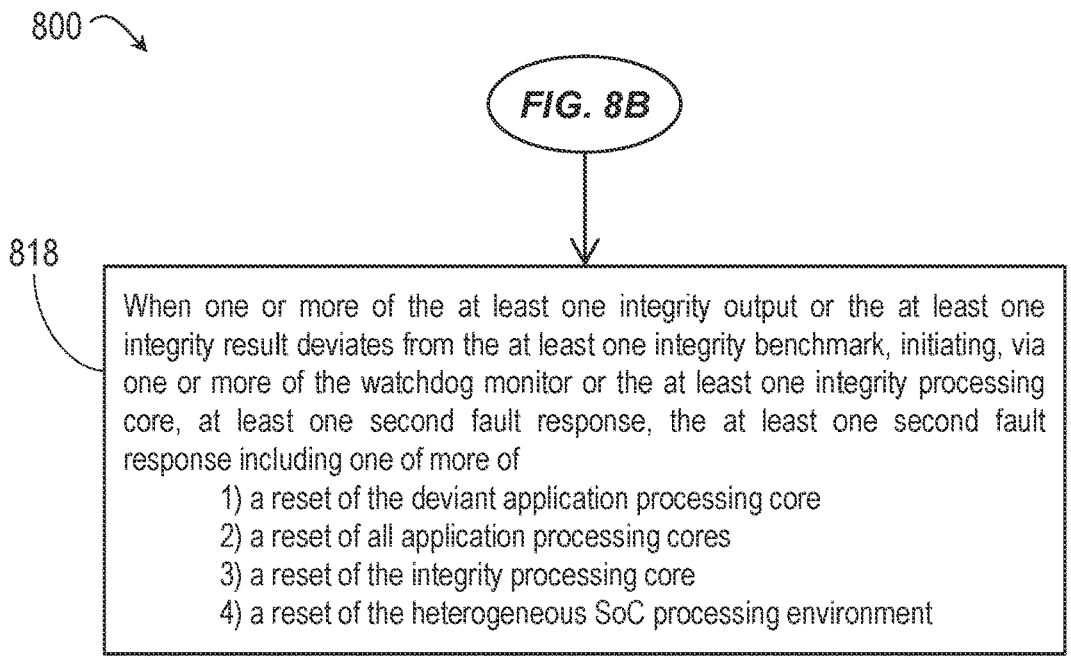

Referring also to FIG. 8C, the method 800 may include an additional step 818. At the step 818, if the integrity result received from the integrity processing core deviates from the locally generated integrity benchmark, the watchdog monitor detects a fault condition with respect to the integrity processing core. Accordingly, the watchdog monitor resets the integrity processing core and/or may initiate other fault responses with respect to the integrity processing core, e.g., resetting the SoC processing environment as a whole.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A heterogeneous multi-core processing environment including at least one system-on-a-chip (SoC), the at least one SoC comprising:

one or more application processing cores associated with a first architecture,
and
at least one integrity processing core associated with a second architecture;
each application processing core including:
at least one safety critical application configured for execution on the application processing core, the at least one safety critical application configured to receive at least one set of dynamic input data via at least one input/output (I/O) interface;
and
at least one integrity application configured for execution on the application processing core, the at least one integrity application configured to:
receive at least one first set of dynamic input data via the at least one I/O interface;
generate at least one integrity output based on the first set of dynamic input data and one or more function sets;
and
forward the at least one integrity output to the at least one integrity processing core;
and
the at least one integrity processing core including at least one integrity monitor configured for execution on the integrity processing core, the at least one integrity monitor configured to:
receive the at least one first set of dynamic input data via the at least one I/O interface;
receive the at least one integrity output from the one or more application processing cores;
generate at least one integrity result based on the at least one first set of dynamic input data and the one or more function sets;
and
when the at least one integrity result and the at least one integrity output deviate, initiate at least one fault response.

2. The heterogeneous multi-core processing environment of claim 1, wherein the at least one integrity monitor is configured to compare the at least one integrity result and the at least one integrity output.

3. The heterogeneous multi-core processing environment of claim 1, wherein the at least one fault response includes at least one of:

initiating a reset of the one or more application processing cores;
or
initiating a reset of the multi-core processing environment.

4. The heterogeneous multi-core processing environment of claim 1, wherein:
the at least one deviant integrity output is associated with at least one first application processing core of the one or more application processing cores;
and
the at least one fault response includes initiating a reset of the at least one first application processing core.

5. The heterogeneous multi-core processing environment of claim 1, wherein:
the at least one integrity application and the at least one integrity monitor are configured to concurrently receive the at least one first set of dynamic input data;
and
the at least one integrity result and the at least one integrity output deviate when the at least one integrity monitor fails to receive the at least one integrity output within a threshold time relative to the generation of the at least one integrity result.

6. The heterogeneous multi-core processing environment of claim 1, wherein:
the one or more application processing cores are associated with a first power source;
and
the at least one integrity processing core is associated with a second power source, the second power source isolated from the first power source.

7. The heterogeneous multi-core processing environment of claim 1, wherein:
the one or more application processing cores are associated with a first timing source;
and
the at least one integrity processing core is associated with a second timing source, the second timing source isolated from the first timing source.

8. The heterogeneous multi-core processing environment of claim 1, wherein:
the first architecture corresponds to at least one first instruction set architecture (ISA);
and
the second architecture corresponds to at least one second ISA.

9. The heterogeneous multi-core processing environment of claim 1, wherein:
the at least one integrity application is configured to receive the at least one first set of dynamic input data via at least one of a first I/O interface of an application processing core or a first network path to the application processing core;
and
the at least one integrity monitor is configured to receive the at least one first set of dynamic input data via at least one second I/O interface of an integrity processing core or a second network path to the integrity processing core.

10. The heterogeneous multi-core processing environment of claim 1, wherein:
one of the one or more application processing cores and the at least one integrity processing core is embodied in a specialized processing unit.

11. The heterogeneous multi-core processing environment of claim 1, further comprising:

at least one watchdog monitor configured for execution on independently provisioned logic associated with at least one third architecture, the at least one watchdog monitor configured to:
receive the at least one integrity output from the at least one application processing core;
receive the at least one integrity result from the at least one integrity processing core;
receive at least one first set of dynamic input data via the at least one I/O interface;
generate at least one integrity benchmark, based on the received first set of dynamic input data and the one or more function sets;
and
compare the at least one integrity output, the at least one integrity result, and the at least one integrity benchmark.

12. The heterogeneous multi-core processing environment of claim 11, wherein the at least one fault response is a first fault response, and wherein:
one or more of the integrity monitor or the watchdog monitor is configured to initiate at least one second fault response when one or more of the at least one integrity output and the at least one integrity result deviates from the at least one integrity benchmark.

13. A method for integrity monitoring in a heterogeneous system-on-a chip (SoC) processing environment, the method comprising:
receiving, via at least one integrity application configured for execution on at least one application processing core, the at least one application processing core associated with a first architecture, at least one set of dynamic input data;
receiving, via at least one integrity monitor configured for execution on an integrity processing core, the integrity processing core associated with a second architecture, the at least one set of dynamic input data;
generating, via the at least one integrity application, at least one integrity output based on the received set of dynamic input data and one or more function sets;
generating, via the at least one integrity monitor, at least one integrity result based on the received set of dynamic input data and the one or more function sets;
comparing the at least one integrity output and the at least one integrity result;
and
when the at least one integrity output and the at least one integrity result deviate, initiating at least one fault response.

14. The method of claim 13, wherein comparing the at least one integrity output and the at least one integrity result includes:
forwarding, via the at least one integrity application, the at least one integrity output to the at least one integrity monitor;
comparing, via the at least one integrity monitor, the at least one integrity output and the at least one integrity result.

15. The method of claim 13, wherein when the at least one integrity output and the at least one integrity result deviate, initiating at least one fault response includes at least one of:
initiating, via the integrity monitor, a reset of the at least one application processing core associated with the deviant integrity output;
initiating, via the integrity monitor, a reset of all application processing cores of the heterogeneous SoC processing environment;

or initiating, via the integrity monitor, a reset of the heterogeneous SoC processing environment.

16. The method of claim 13, further comprising:

receiving, via at least one watchdog monitor configured for execution on independently provisioned logic associated with at least one third architecture, the at least one set of dynamic input data;

and generating, via the at least one watchdog monitor, at least one integrity benchmark based on the received set of dynamic input data and the one or more function sets;

and wherein comparing the at least one integrity output and the at least one integrity result includes:

forwarding, via the at least one integrity application, the at least one integrity output to the at least one watchdog monitor;

forwarding, via the at least one integrity monitor, the at least one integrity result to the at least one watchdog monitor;

and comparing, via the at least one watchdog monitor, the at least one integrity output, the at least one integrity result, and the at least one integrity benchmark.

17. The method of claim 16, wherein when the at least one integrity output and the at least one integrity result deviate, initiating at least one fault response includes:

when one or more of the at least one integrity output or the at least one integrity result deviates from the at least one integrity benchmark, initiating, via the at least one watchdog monitor or the at least one integrity monitor, at least one second fault response, the at least one second fault response including one or more of:

a reset of the at least one application processing core associated with the deviant integrity output;

a reset of all application processing cores;

a reset of the integrity processing core;

or a reset of the heterogeneous SoC processing environment.

18. The method of claim 13, wherein:

the at least one application processing core is associated with a first power source;

and the integrity processing core is associated with a second power source.

19. The method of claim 13, wherein:

the at least one application processing core is associated with a first timing source;

and the integrity processing core is associated with a second timing source.

20. The method of claim 13, wherein:

receiving, via the at least one integrity monitor configured for execution on the integrity processing core, the at least one set of dynamic input data includes:

receiving, via the at least one integrity monitor and concurrently with the at least one integrity application, the at least one set of dynamic input data;

and wherein the at least one integrity result and the at least one integrity output deviate when the at least one integrity monitor fails to receive the at least one integrity output within a threshold time relative to the generation of the at least one integrity result.

* * * * *